United States Patent
Wipperfurth et al.

(10) Patent No.: US 6,588,460 B1
(45) Date of Patent: Jul. 8, 2003

(54) DEVICE FOR FILLING AN ACCUMULATOR CELL WITH ELECTROLYTE

(75) Inventors: Walter Wipperfurth, Taunusstein-Hambach (DE); Markus Rompel, Limburg-Lindenholzhausen (DE)

(73) Assignee: CMW Automation GmbH, Runkel-Ennerich (DE)

( * ) Notice: Subject to any disclaimer, the term of this patent is extended or adjusted under 35 U.S.C. 154(b) by 0 days.

(21) Appl. No.: 09/830,585

(22) PCT Filed: Aug. 18, 2000

(86) PCT No.: PCT/EP00/08060

§ 371 (c)(1),
(2), (4) Date: Aug. 31, 2001

(87) PCT Pub. No.: WO01/20694

PCT Pub. Date: Mar. 22, 2001

(30) Foreign Application Priority Data

Sep. 10, 1999 (DE) ................................. 299 15 950 U

(51) Int. Cl.[7] .............................................. B65B 31/00
(52) U.S. Cl. ............................. 141/59; 141/35; 141/32; 141/1.1
(58) Field of Search .......................... 141/59, 35, 32, 141/31, 1.1, 127; 137/14, 260, 261, 263, 266, 883

(56) References Cited

U.S. PATENT DOCUMENTS

| | | | | |
|---|---|---|---|---|
| 1,198,619 A | * | 9/1916 | Clymer | |
| 1,361,437 A | * | 12/1920 | Blau | |
| 1,471,048 A | * | 10/1923 | Menger | |
| 1,506,172 A | * | 8/1924 | Fredette | |
| 1,587,147 A | * | 6/1926 | Clark | |
| 3,249,132 A | * | 5/1966 | Eberle | |
| 3,556,175 A | | 1/1971 | Wolf et al. | |
| 3,753,785 A | * | 8/1973 | Oswald | |
| 3,912,541 A | * | 10/1975 | Britz et al. | |
| 4,061,163 A | | 12/1977 | Decker et al. | |
| 4,289,176 A | * | 9/1981 | Evans | |
| 4,350,185 A | * | 9/1982 | Quist | |
| 4,782,279 A | * | 11/1988 | Selanger | |
| 5,002,100 A | * | 3/1991 | Frederick | |
| 5,356,733 A | | 10/1994 | Green et al. | |
| 5,453,334 A | * | 9/1995 | Melichar | |
| 5,588,970 A | * | 12/1996 | Hughett et al. | |
| 5,731,099 A | | 3/1998 | Badger et al. | |
| 6,418,982 B1 | * | 7/2002 | Zhang et al. | |

FOREIGN PATENT DOCUMENTS

| | | |
|---|---|---|
| DE | 2604622 A1 | 8/1977 |
| DE | 3912846 C1 | 6/1990 |
| DE | 19854434 A1 | 6/1999 |
| JP | 63-091952 | 4/1988 |

* cited by examiner

Primary Examiner—David J. Walczak
Assistant Examiner—Khoa Huynh
(74) Attorney, Agent, or Firm—Charles P. Boukus, Jr.

(57) ABSTRACT

An apparatus (10) for filling at least one cell of an accumulator (12) with electrolyte is described, having a vacuum pump (14) for evacuating the cell of the accumulator (12), and having a filler device (16) for introducing the electrolyte into a fill opening (32) of a cell, and having a container (18) for receiving the entire accumulator (12), the container (18) communicating with the vacuum pump (14) via a connection stub (20), so that the accumulator (12) can be put in its entirety under a vacuum, and the filler device (16) has at least one delivery line (22) for the electrolyte, which line is extended in vacuum-tight fashion into the container (18). The delivery line (22) on each end has a respective filler head (34) with an outlet stub (36), and the outlet stub (36) engages the inside of the fill opening (32) of a cell with play (FIG. 1).

15 Claims, 2 Drawing Sheets

DEVICE FOR FILLING AN ACCUMULATOR CELL WITH ELECTROLYTE

SPECIFICATION

Figure 1:
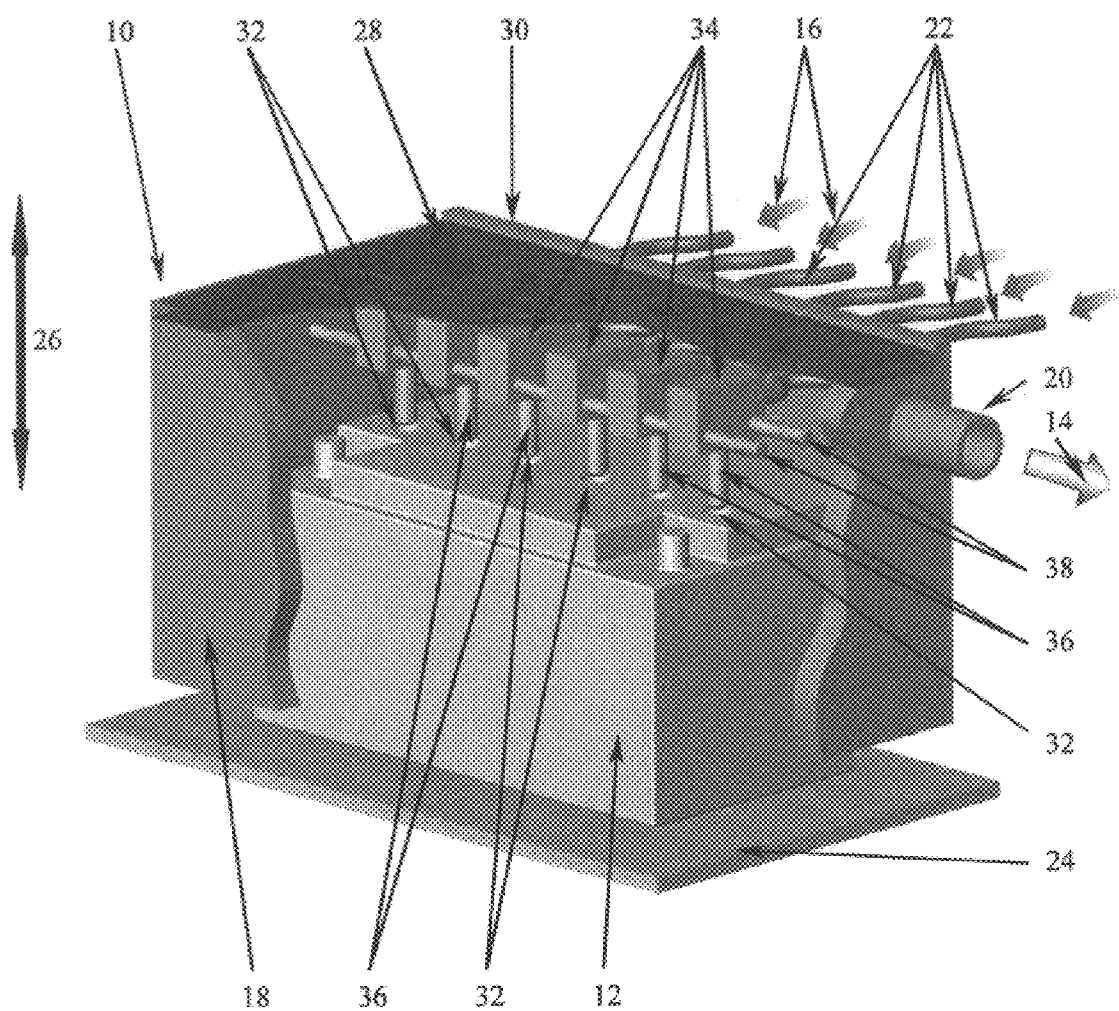

The invention relates to an apparatus for filling at least one cell of an accumulator with electrolyte, having a vacuum pump for evacuating the cell of the accumulator, and having a filler device for introducing the electrolyte into a fill opening of a cell, and having a container for receiving the entire accumulator, the container communicating with the vacuum pump via a connection stub, so that the accumulator can be put in its entirety under a vacuum, and the filler device has at least one delivery line for the electrolyte, which line is extended in vacuum-tight fashion into the container.

In a number of accumulators, evacuation of the cells before they are filled with electrolyte is necessary. The reason for this is that the filling with the electrolyte, which can for instance also be in gel form, must be done within a reasonably short period of time. Along with the evacuation of the cells, the formation of air pockets in the cells filled with electrolyte for instance in gel form must also be avoided.

Until now, the evacuation especially of multi-cell accumulators was done by evacuating each cell of the accumulator separately via the fill bore, by means of a vacuum connection stub, and when the appropriate vacuum was reached, the electrolyte was introduced into the cell via the same connection stub. A disadvantage of these known apparatuses is that because of the vacuum prevailing in the various cells, deformation of the entire accumulator can occur. Such deformation puts considerable stress on the accumulator housing, for instance on its weld points, so that under some circumstances the accumulator housing can be damaged or even destroyed. Also because of the evacuation of only some cells of the accumulator, the inserts, such as the lead plates, can be pressed hard against one another, so that with this conventional apparatus, damage to the separator cannot be precluded, either. Another essential problem is that because of the deformation of the entire accumulator, it is often impossible to introduce the requisite volume of electrolyte into the individual cells. Furthermore, the known apparatus is mechanically quite complex. The fill opening of each cell has to be sealed off individually. The same is true for the venting bores.

From U.S. Pat. No. 4,061,163, an apparatus with the characteristics recited at the outset is known. This apparatus has a container, in which one or more lithium cells can be disposed so as to be filled with electrolyte. The lithium cells, with their single fill opening pointing downward, are positioned on a stand inside the container. The container is then evacuated, to remove water and water vapor from the cells. Next, the negative pressure is reduced, so that it is above the boiling point of the liquid electrolyte to be introduced. After that, the container is filled with electrolyte, and the inlet openings of the lithium cells dip into the electrolyte. Next, the negative pressure in the containers is brought to atmospheric pressure and then raised to an overpressure, so that the electrolyte can penetrate the lithium cell through the inlet opening. After filling, the inlet opening is hermetically sealed, and the lithium cell is ready for use.

An electrolyte filling apparatus is also known from U.S. Pat. No. 5,356,733. In it, one or more cells of a battery are first subjected to a negative pressure so that they can then be filled with an electrolyte. The special aspect of this apparatus is that a deflection plate is provided below the fill opening of the cell, to prevent the electrolyte from striking the accumulator plates, or the glass mat separators disposed between them, directly. This is intended to provide maximum protection against damage to the cells as the electrolyte flows in. However, it cannot be learned from this patent that the accumulator can be put as a whole under a vacuum and to that end is entirely disposed in a container.

U.S. Pat. No. 5,731,099 or German Patent Disclosure DE 26 04 622 A1 discloses apparatuses with which each cell of the accumulator is evacuated separately via the filling bore by means of a connection stub, and when the applicable vacuum is reached, the electrolyte is introduced into the cell via the same connection stub.

Finally, from German Patent DE 39 12 846 C1, a method for filling electrochemical cells, especially high-performance cells, such as lithium cells, with an electrolyte is known, in which the cell is first evacuated and simultaneously checked for short-circuiting, and if a short circuit is found, the filling operation is discontinued. Once the final vacuum is reached, the cell is then filled with the electrolyte, and at the same time the electrical voltage applied to the cell is monitored, and if a voltage deviation is found, the filling operation is discontinued.

By comparison, the object of the present invention is to improve an apparatus of the type defined at the outset in such a way that while avoided the aforementioned disadvantages, simple, fast evacuation and filling of the cells of the accumulator with electrolyte is made possible.

In the apparatus having the characteristics recited at the outset, this object is attained essentially in that a container for receiving the entire accumulator is provided, and the container communicates with the vacuum pump via a connection stub, so that the accumulator can be put as a whole under a vacuum, and the filler device has at least one and preferably a plurality of delivery lines for the electrolyte that are extended in vacuum-tight fashion into the container.

The advantages attainable with the apparatus of the invention are that because the vacuum is applied to the entire accumulator, the accumulator is not subject to any stresses whatever, and thus no deformation of the accumulator housing occurs. Accordingly, the entire space in the cells and fill openings is available for filling with electrolyte. The filling operation can thus be done faster, and the fill quantity can be optimized. A greater vacuum can also be attained in the container than is possible with the conventional apparatus, since the container can be embodied as extremely vacuum-tight. The major effort and expense for sealing off the fill openings for the individual cells and sealing off the venting bores is also dispensed with. Care must merely be taken that the container itself be sealed off. Air pockets in the electrolyte are also counteracted to an increased extent, since with the apparatus of the invention a greater vacuum is attainable. This improves the quality of the accumulator considerably, especially with regard to spontaneous discharge. Since in the apparatus of the invention the connection stub of the vacuum pump is not disposed directly in the region of the delivery line for the electrolyte, it is also possible to omit an otherwise required acid separator preceding the vacuum pump. The container housing also provides splash protection for the operator, since the accumulator is hermetically enclosed by the container housing during the filling operation.

To make the filling operation easier, the delivery lines especially advantageously have a filler head with an outlet stub on each end. The outlet stub engages the inside of the fill openings of the cells of the accumulator with play, and so the individual cells, with the filler head or outlet stub already located in the filling position, can first be evacuated and then filled with electrolyte.

In a first advantageous feature of the invention, the container can be placed in vacuum-tight fashion on a base plate that supports the accumulator. This provision creates a structurally simple sealing face between the container and the base plate, so that with relatively simple sealing means, a high vacuum can be maintained inside the container.

Especially advantageously, a lifting device is assigned to the container, and by means of it the container can be raised and lowered from the base plate. After the termination of the filling operation, the accumulator is removed from the base plate and replaced with a new accumulator that is to be filled. To that end, by means of the lifting device, the container is first raised, and after the accumulators have been replaced it is lowered again onto the base plate, which then contacts the container in vacuum-tight fashion.

Advantageously, in a further feature of the invention, the container has a shape adapted substantially to the accumulator and is embodied substantially as a box-like housing, which is only slightly larger than the accumulator itself. With regard to the dimensions, care must merely be taken that the delivery lines for the electrolyte have sufficient space in the container. This provision of making the container as small as possible in terms of its volumetric content makes it unnecessary to pump out a large amount of air so as to create the vacuum in the cells of the accumulator, thus further shortening the time required for the filling operation.

Especially advantageously, the one or more delivery lines are extended through a housing wall of the container to fill openings of the cells of the accumulator.

If the accumulator has a plurality of cells, each with one fill opening, as is generally the case for the accumulators in question, then especially advantageously, each fill opening or cell is assigned one delivery line with a filler head or outlet stub.

Advantageously, the delivery lines and filler heads are secured in the housing of the container, preferably on rods or similar retaining means. The delivery lines or filler heads are disposed in the housing of the container such that when the container is lowered onto the base plate, the delivery lines or filler heads automatically move into the fill openings of the cells and are received with play in these fill openings once the container is seated on the base plate. Once the lowering operation has been ended, a vacuum is then created in the container and hence in the cells of the accumulator by means of the vacuum pump. Once a given vacuum limit value is reached, the electrolyte is introduced into the cells, via the delivery lines and filler heads. Once the filling operation is ended, the container is ventilated and is raised from the base plate by the lifting device, in the course of which the delivery lines and filler heads are removed, again automatically, from the fill openings. Once the filled accumulator is exchanged for an accumulator that has not yet been filled, the container is lowered again, and once again the delivery lines and filler heads automatically move into the fill openings of the cells, allowing the evacuation and filling operation to be started over again.

In this regard it is appropriate for the filler heads to be disposed on the container or its housing in a way that corresponds to the disposition of the fill openings of the accumulator.

The possibility also exists of securing the filler heads and delivery lines, adjustably relative to one another, to the retaining means or rods, so that the apparatus can also be adapted to different structural forms of accumulators, in which for instance the fill openings are disposed at different spacings.

Finally, in another advantageous characteristic of the invention, the connection stub for the vacuum device is disposed peripherally of the container, in a corner region remote from the fill openings of the accumulator or from the filler heads. Because of this provision, the connection stub for the vacuum pump is as far away as possible from the fill openings and filler heads, so that the risk that electrolyte will enter into the connection stub for the vacuum pump is effectively counteracted.

Further advantages, possible applications and embodiments of the invention will become apparent from the ensuing description of an exemplary embodiment. All the characteristics described and/or shown in the drawings form the subject of the present invention both alone and in any arbitrary combination, regardless of how they are summed up in the claims and regardless of the claims dependencies.

Figure 2:
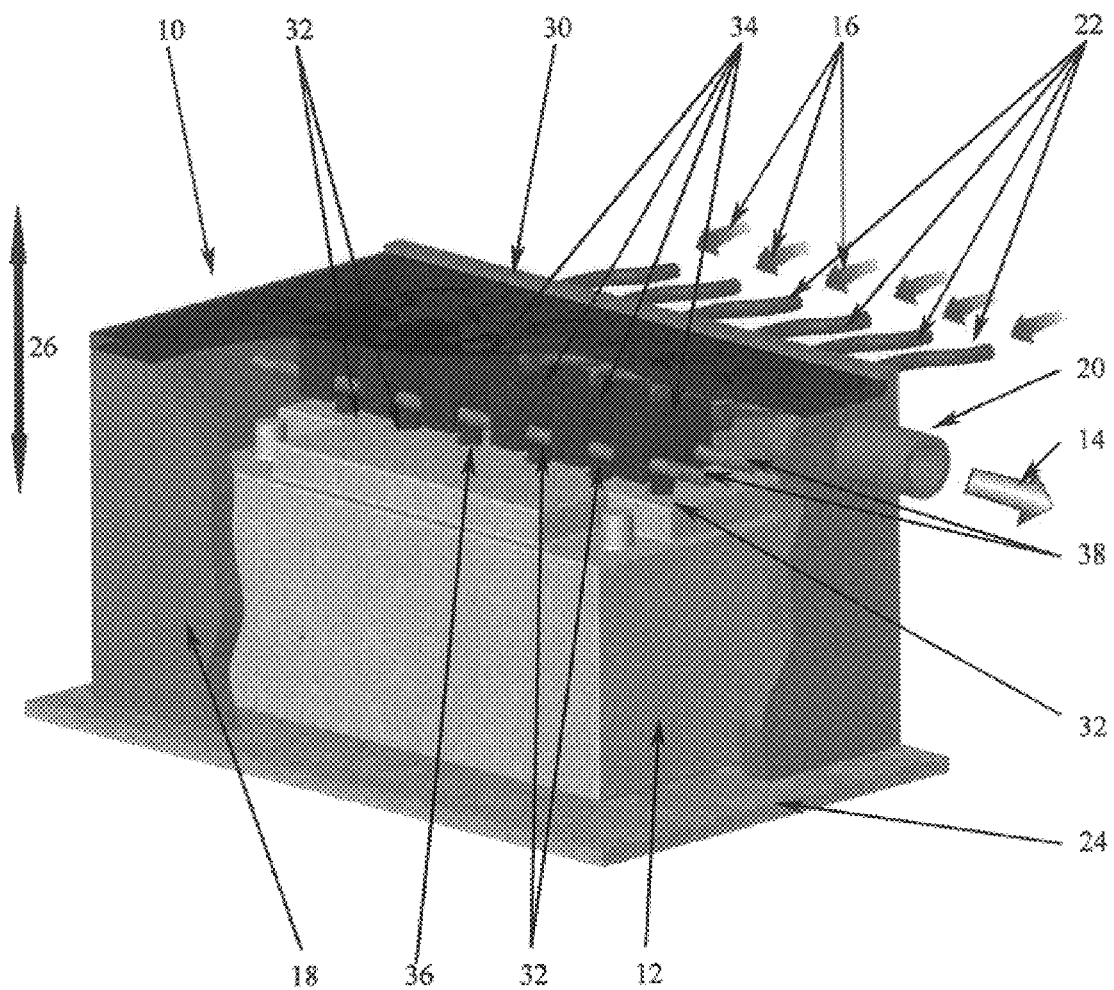

Shown are:

FIG. 1, one exemplary embodiment of the apparatus of the invention, in a perspective view with the container housing partly cut away, shown in the raised position of the container; and FIG. 2, the apparatus of FIG. 1, with the container lowered onto the base plate.

In the drawings, an apparatus 10 for filling the cells of an accumulator 12 with electrolyte is shown. For evacuation of the cells of the accumulator 12, a vacuum pump is provided, symbolically represented by reference numeral 14. The apparatus 10 also has a filler device 16 for introducing the electrolyte into the cells of the accumulator 12.

The accumulator 12 is received entirely in a container 18, and the container 18 communicates with the vacuum pump 14 via a connection stub 20. As a result, it is possible for the accumulator 12 to be put as a whole under a vacuum. The filler device 16 has at least one and preferably a plurality of delivery lines 22 for the electrolyte, and the delivery lines 22 are extended in vacuum-tight fashion into the container 18.

As seen particularly from FIG. 2, the container 18 can be placed in vacuum-tight fashion on a base plate 24 that supports the accumulator 12. The container 18 is also associated with a lifting device 26, represented symbolically by arrows, with which the container 18 is raised or lowered. The container 18 has a shape adapted substantially to the accumulator 12 and is embodied overall as an essentially box-like housing 28, open at the bottom, that in the lowered position of FIG. 2 is sealed off by the base plate 24. The delivery lines 22 are passed through a housing wall 30 of the container 18 to fill openings 32 of the cells of the accumulator 12. On each end, the delivery lines 22 have a filler head 34 with an outlet stub 36. In the lowered position of the container 18, the outlet stub 36 is received with play in the fill opening 32.

Especially advantageously, the delivery lines 22 and filler heads 34 are secured in or onto the housing 28 of the container 18, preferably on rods 38 or similar retaining means. The positioning of the filler heads 34 above the fill openings 32 corresponds to the disposition of fill openings 32 of the accumulator. The filler heads 34 are also secured, adjustably relative to one another, to the retaining means or rods 38, so that the position of the filler heads 34 can be adapted to individual structural forms of accumulators.

The connection stub 20 for the vacuum pump 14 is disposed peripherally of the container 18, in a corner region remote from the fill openings 32.

LIST OF REFERENCE NUMERALS

10 Apparatus
12 Accumulator
14 Vacuum pump
16 Filler device
18 Container
20 Connection stub
22 Delivery line
24 Base plate
26 Lifting device
28 Housing
30 Housing wall
32 Fill opening
34 Filler head
36 Outlet stub
38 Rod

What is claimed is:

1. An apparatus (10) for filling at least one cell of an accumulator (12) with electrolyte, comprising:

a base plate (24) for supporting the accumulator (12), a filler device (16) for introducing the electrolyte into a fill opening (32) of the at least one cell, a container (18) for receiving the entire accumulator (12), said container (18) being raised and lowered by means of an associated lifting device into an upper position and a lower position, wherein in the lower position said container (18) is placed over the accumulator (12) and in vacuum-tight fashion on the base plate (24), the container (18) being connectable to and communicating with a vacuum pump (14) via a connection stub (20), so that the accumulator (12) is put in its entirety under a vacuum to evacuate the cell of the accumulator, the filler device (16) having at least one delivery line (22) for the electrolyte, which line is extended in vacuum-tight fashion into the container (18), the delivery line (22) on its end in the container having a respective filler head (34) with an outlet stub (36), and the outlet stub (36) engageable with the inside of the fill opening (32) of the at least one cell with play.

2. The apparatus of claim 1, characterized in that the container (18) has a shape adapted to receive the accumulator (12) and is embodied as a housing (28) that is open at the bottom.

3. The apparatus of claim 1, characterized in that the at least one delivery line (22) extends through a housing wall (30) of the container (18) to the fill opening (32) of a cell of the accumulator (12).

4. The apparatus of claim 1, characterized in that the accumulator (12) has a plurality of cells, each with one fill opening (32), and each fill opening (32) is assigned one delivery line (22) with a filler head (34) and an outlet stub (36).

5. The apparatus of claim 4, characterized in that the delivery lines (22) and the filler heads (34) are secured in the housing (28) of the container (18) by retaining means.

6. The apparatus of claim 5 wherein the retaining means comprises rods.

7. The apparatus of claim 4, characterized in that the filler heads (34) are secured in the container (18) in a manner corresponding to the disposition of fill openings (32) of the accumulator (12).

8. The apparatus of claim 1, characterized in that the filler heads (34) and delivery lines (22) are secured adjustably relative to one another by retaining means (38).

9. The apparatus of claim 8 wherein the retaining means comprises rods.

10. The apparatus of claim 1, characterized in that the connection stub for the vacuum device is disposed peripherally of the container (18), in a corner region remote from the fill openings (32).

11. An apparatus for filling at least one cell of an accumulator with electrolyte, comprising:

a base plate for supporting the accumulator;

a container open at the bottom, said container being raised and lowered by means of an associated lifting device into an upper position and a lower position, wherein in the lower position said container is placed over the accumulator and in vacuum-tight fashion on the base plate;

means connectable to a vacuum pump for evacuating the container and the at least one cell of the accumulator;

a filler head with an outlet stub mounted in the container by retaining means for being positioned above a fill opening in the at least one cell of the accumulator with the outlet stub extending into the fill opening with play; and a filler device having at least one delivery line for the electrolyte extending in vacuum-tight fashion into the container for introducing the electrolyte into the filler head and through the outlet stub into the fill opening to supply the electrolyte to the at least one cell of the accumulator.

12. The apparatus of claim 11 for filling a plurality of cells in the accumulator wherein the apparatus includes a plurality of the filler heads with outlet stubs mounted in the container by the retaining means for being positioned above fill openings in the corresponding cells of the accumulator with the outlet stubs extending into the respective fill openings with play.

13. The apparatus of claim 12 wherein the filler heads are adjustably mounted by the retaining means.

14. The apparatus of claim 13 wherein the retaining means comprises rods.

15. The apparatus of claim 11 wherein the electrolyte is a gel.

* * * * *